United States Patent
Dalmia et al.

(10) Patent No.: US 6,903,281 B2
(45) Date of Patent: Jun. 7, 2005

(54) METHOD AND APPARATUS FOR REDUCING ERROR WHEN MEASURING MINUTE QUANTITIES OF WEIGHT

(75) Inventors: Avinash Dalmia, Hamden, CT (US); E. Joel McCorkle, Woodbury, CT (US)

(73) Assignee: PerkinElmer Instruments LLC, Shelton, CT (US)

( * ) Notice: Subject to any disclaimer, the term of this patent is extended or adjusted under 35 U.S.C. 154(b) by 82 days.

(21) Appl. No.: 10/300,985

(22) Filed: Nov. 21, 2002

(65) Prior Publication Data

US 2003/0094313 A1 May 22, 2003

Related U.S. Application Data

(60) Provisional application No. 60/331,731, filed on Nov. 21, 2001.

(51) Int. Cl.[7] .......................... G01G 21/22; G01G 19/00
(52) U.S. Cl. ...................... 177/212; 177/245; 177/253; 177/262; 374/14; 73/73
(58) Field of Search ............................... 374/14; 73/73; 177/212, 245, 253, 262, 263

(56) References Cited

U.S. PATENT DOCUMENTS

| 4,824,790 | A | 4/1989 | Carangelo et al. ........... 436/157 |
| 5,055,264 | A | 10/1991 | Czarnecki ..................... 422/80 |
| 5,368,391 | A | 11/1994 | Crowe et al. ................. 374/10 |
| 5,440,120 | A | 8/1995 | Roberts et al. ............. 250/288 |
| 5,588,746 | A | 12/1996 | Minobe et al. ............... 374/10 |
| 6,057,516 | A | 5/2000 | Nakamura et al. .......... 177/212 |
| 6,241,876 | B1 | 6/2001 | Tsao et al. .................. 208/137 |
| 6,250,799 | B1 | 6/2001 | Kinoshita et al. ............. 374/14 |
| 6,279,387 | B1 | 8/2001 | Kikuchi ......................... 73/76 |

*Primary Examiner*—Randy W. Gibson
(74) *Attorney, Agent, or Firm*—St. Onge Steward Johnston & Reens LLC (57) ABSTRACT

The invention relates to an instrument and method for measuring minute quantities of weight, including a pan for holding a sample to be weighed, a chamber for forming an enclosure about the pan, and a hang-down wire coupled to the pan for suspending the pan within the chamber. The pan has volume less than 0.020 cm$^3$ and the hang-down wire has a volume less than 0.01 cm$^3$. The invention may also include a carrier gas, placed within the chamber, having a generally consistent density over changes in temperature.

19 Claims, 7 Drawing Sheets

COMPARISON OF MODEL DATA AND EXPERIMENTAL DATA FOR
TGA BASELINE CHANGES

FIG. 6

EFFECT OF CARRIER GAS (He vs NITROGEN GAS) ON TGA
BASELINE CHANGES (EXPERIMENTAL AND MODEL RESULTS)
WITH CERAMIC PAN AND QUARTZ HDW

FIG. 7

EFFECT OF DIFFERENT CARRIER GASES ON TGA BASELINE
CHANGES WITH CERAMIC PAN AND QUARTZ HDW WIRE

METHOD AND APPARATUS FOR REDUCING ERROR WHEN MEASURING MINUTE QUANTITIES OF WEIGHT

RELATED APPLICATIONS

This patent application claims the benefit of, under Title 35, United States Code, Section 119(e), U.S. Provisional Patent Application No. 60/331,731 filed Nov. 21, 2001.

FIELD OF THE INVENTION

The invention relates to a method and apparatus for minimizing error when measuring minute quantities of weight.

BACKGROUND OF THE INVENTION

Measuring minute quantities of weight is often a challenging task for various reasons. Limitations of the measuring equipment, effects on the experiment due to the surrounding conditions, measurement error, and repeatability are just some factors that may contribute to problems with accurately measuring minute quantities of weight.

Generally, measuring small amounts of weight entails use of sensitive equipment, typically scales with sensitivity in units of micro grams. Additionally, error may affect the accuracy of readings when making measurements because, regardless how small, error may constitute a considerable percentage of the weight being measured, especially minute quantities of weight. Hence, the error, which is generally related to equipment shortcomings, whether it be calibration error, human error, and/or repeatability error, and which may be outside the control of the user making the measurements, can severely limit the reliability of the measurements. Reducing error in any of these areas is believed to improve accuracy.

Figure 1:
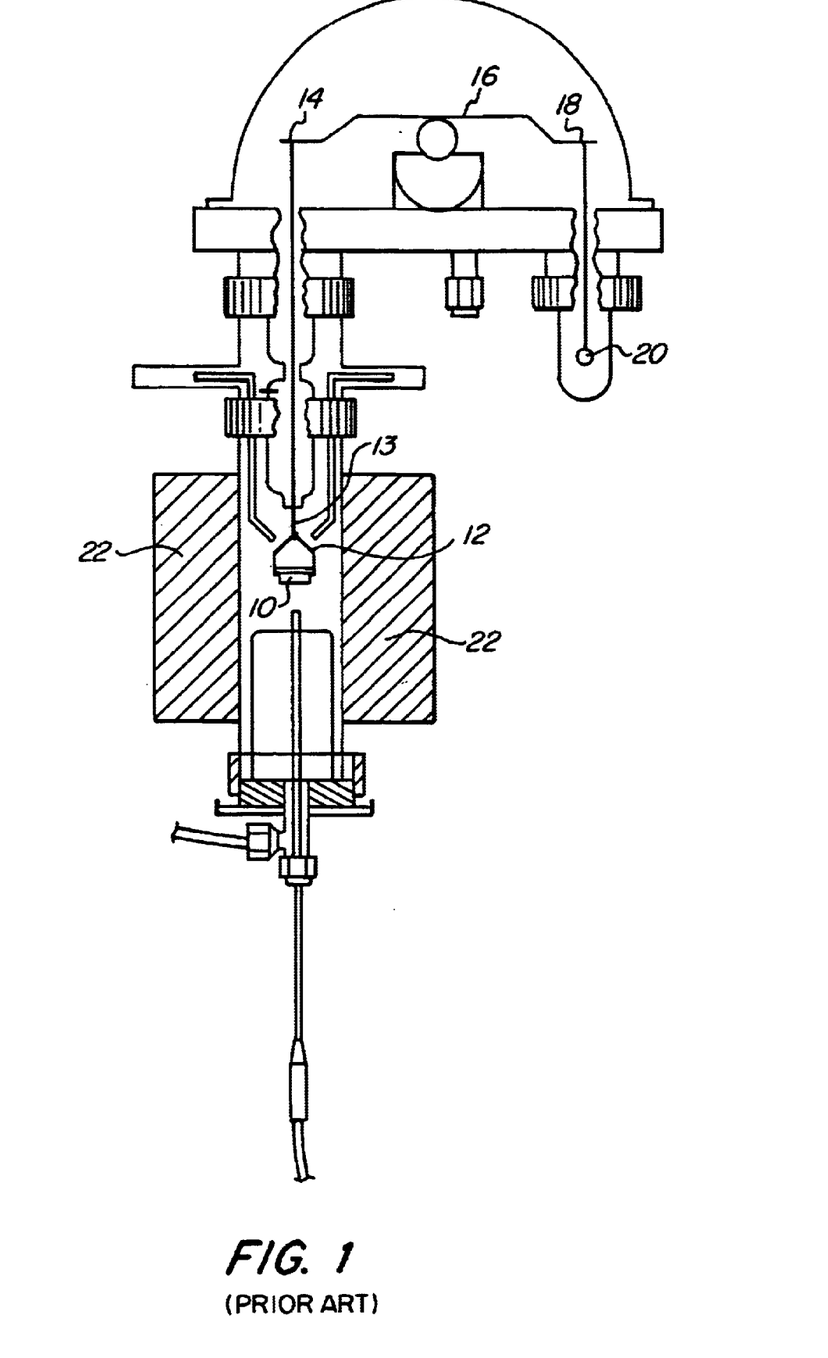
FIG. 1 depicts a thermal gravimetric instrument in accordance with the prior art.

A typical instrument that may be used to measure changes in minute quantities of weight is a thermal gravimetric analyzer ("TGA"), as shown in FIG. 1. A TGA often includes a pan 10 for supporting the sample to be weighed, a hang-down wire 13 that attaches pan 10 to one end 14 of an arm 16, and a stir-up 12 that connects pan 10 to hang-down wire 13. The other end 18 of arm 16 has a known weight 20 to counter balance the sample.

As shown, pan 10 is suspended within heater 22. In this orientation, effects caused by the pan's surroundings may affect the measurement of the sample in pan 10. Typical effects may include any static electricity in heater 22, any unwanted chemical reaction between the sample and its surrounding, effects due to convection, and/or any pressure or temperature differentials within heater 22 or between the inside of heater 22 and the outside of heater 22.

Additionally, theoretical and measured data suggest that a changed in weight is dependent upon a buoyancy of the pan, or the tendency of the pan to float, or be supported, by the atmospheric gas beneath the pan. Buoyancy generally contributes to error, which is believed to negatively affect accurate weight measurements, because buoyancy possibly hinders an ability to obtain a true reading of weight since it is at least supported in part by the atmospheric gas.

Further, buoyancy was found to be affected by the type of gas in the chamber surrounding the weight and pan, or the carrier gas. The carrier gas used typically affects buoyancy because buoyancy depends, in part, upon the carrier gas' density. Measured data may suggest, as temperature increases, the density of certain carrier gases varies and this variance affects buoyancy, which typically causes unwanted changes in weight during these temperature changes.

In addition to buoyancy, theoretical data suggests that the sample weight is affected by a volume of the pan and/or hang-down wire. From Archimede's principle, and assuming negligible effects due to isothermal conditions and convection, the following relation may exist between the volume of the sample pan, volume of the hang-down wire, density of the pan and hang-down wire, and density of the carrier gas:

$$W(T) = \text{Actual Weight} - \text{Buoyancy}$$

$$W(T) = V_p \rho - V_p \rho_c(T)$$

where W(T) is the measured weight at a given temperature.

$V_p$ is volume of the sample pan plus the volume of the hang-down wire.

$\rho$ is effective density of the sample pan plus the density of the hang-down wire.

$\rho_c$ is the density of the carrier gas and is a function of temperature.

Hence, a pan and/or hang-down wire that occupies a large volume often results in greater error.

U.S. Pat. No. 6,057,516 to Nakamura et al. appears to relate to an improved TGA for measuring variations in the weight of a sample caused by temperature variations of the sample. To achieve this end, a weight of the balance beam is often minimized. This commonly results in a disadvantage of having a beam with reduced structural integrity where the hang-down wire may move relative to the balance beam due to bending of the beam. This problem may be exacerbated when measuring larger loads. The invention provides a mechanism that may overcome this disadvantage by preventing a large load to be applied to the hang-down wire without increasing the strength of the hang-down wire. However, strengthening the hang-down wire, which may include thickening the wire or using a heavier duty wire, increases the wire's volume and appears to teach away from the theory of Archimede's principle.

U.S. Pat. No. 5,055,264 to Czamecki appears to relate to a system for measuring changes of weight by directing a flow of condensable gases away so that measurements of variations in weight may be obtained.

U.S. Pat. No. 6,279,387 to Kikuchi appears to relate to a device for measuring a moisture content. Helium is used as a carrier gas.

Both Czamecki and Kikuchi do not seem to reduce variations in the weight of the sample by addressing, as illustrated by Archimede's principle, the volume or the type of carrier gas chosen.

What is desired, therefore, is a measurement system for improving measurements of minute quantities of weight. What is also desired is a system for reducing the effects of the sample's surroundings on the sample's measurement. Another desire is to reduce error when measuring minute quantities of weight. What is also desired is a way for determining factors that negatively affect measurement accuracy and minimizing the effects of these factors.

SUMMARY OF THE INVENTION

It is an object of the invention to improve the accuracy of measurements of minute quantities of weight.

It is another object of the invention to reduce error when measuring minute quantities of weight by reducing the volume of the pan used to hold the sample to be measurement.

It is another object of the invention is to reduce error when measuring minute quantities of weight by using a carrier gas having a generally consistent density over changes in temperature.

Accordingly, it is an object of the invention to provide an instrument for measuring minute quantities of weight, including a pan for holding a sample to be weighed, a chamber for forming an enclosure about the pan, and a hang-down wire coupled to the pan for suspending the pan within the chamber. The pan has a volume less than 0.020 cm$^3$ and the hang-down wire has a volume less than 0.01 cm$^3$.

In some embodiments, the instrument may include a pan having a volume of less than 0.009 cm$^3$. In further embodiments, the instrument may include a pan having a volume less than 0.005 cm$^3$.

Similarly, the instrument may also include a hang-down wire having a volume less than 0.008 cm$^3$ and, in still further embodiments, include a hang-down wire having a volume less than 0.006 cm$^3$.

Optionally, the instrument may include a carrier gas that is generally consistent over changes in temperature to further reduce variations in mass measurements. The carrier gas may be Helium or Hydrogen.

In another embodiment of the invention, an instrument for measuring minute quantities of weight is provided, including a pan for holding a sample to be weighed, a chamber for forming an enclosure about the pan, a hang-down wire coupled to the pan for suspending the pan within the chamber, and a carrier gas having at least one part selected from the group consisting of helium, hydrogen, and combinations thereof.

In some embodiments, the carrier gas has a second part being a reactant gas.

In an aspect of the invention, the instrument relates to a method for measuring minute quantities of weight, including the following steps: providing a pan having a volume of less than 0.020 cm$^3$ for holding a sample to be weighed, forming an enclosure about the pan, and suspending the pan within the enclosure with a hang-down wire having a volume less than 0.01 cm$^3$.

In a further aspect, the method may include the step of reducing the volume of the pan to less than 0.009 cm$^3$ and, in still another aspect, the method may include reducing the volume of the pan to less than 0.005 cm$^3$.

The method may include the step of reducing the volume of the hang-down wire to less than 0.008 cm$^3$ and, in further aspects, reducing the volume of the hang-down wire to less than 0.006 cm$^3$.

The method may optionally include the step of placing a carrier gas within the enclosure having a density that is generally consistent over changes in temperature.

In another aspect of the invention, a method is provided for measuring minute quantities of weight, including the steps of providing a pan for holding a sample to be weighed, forming an enclosure about the pan, suspending the pan within the enclosure with a hang-down wire, and placing a carrier gas within the enclosure having a density that is generally consistent over changes in temperature.

The invention and its particular features and advantages will become more apparent from the following detailed description considered with reference to the accompanying drawings.

DETAILED DESCRIPTION OF THE DRAWINGS

Figure 2:
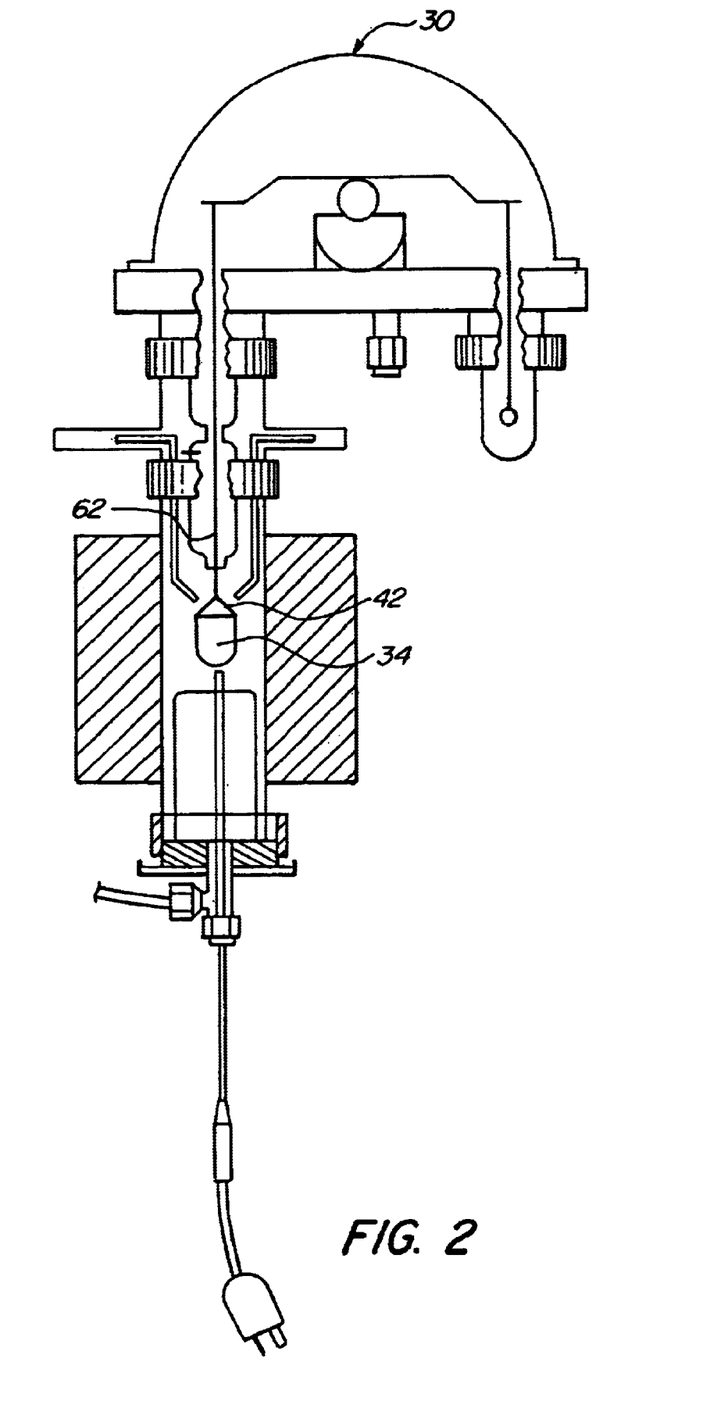
FIG. 2 depicts a thermal gravimetric instrument having a hang-down wire and sample pan in accordance with the invention.

FIG. 2 shows the thermal gravimetric analyzer ("TGA") in accordance with the invention. TGA 30 includes sample pan 34 for holding the sample to be weighed, stir-up 42 for supporting and connecting pan 34 to hang-down wire 62. Hand-down wire 62 then connects pan 34 to the remainder of TGA 30.

Figure 3A:
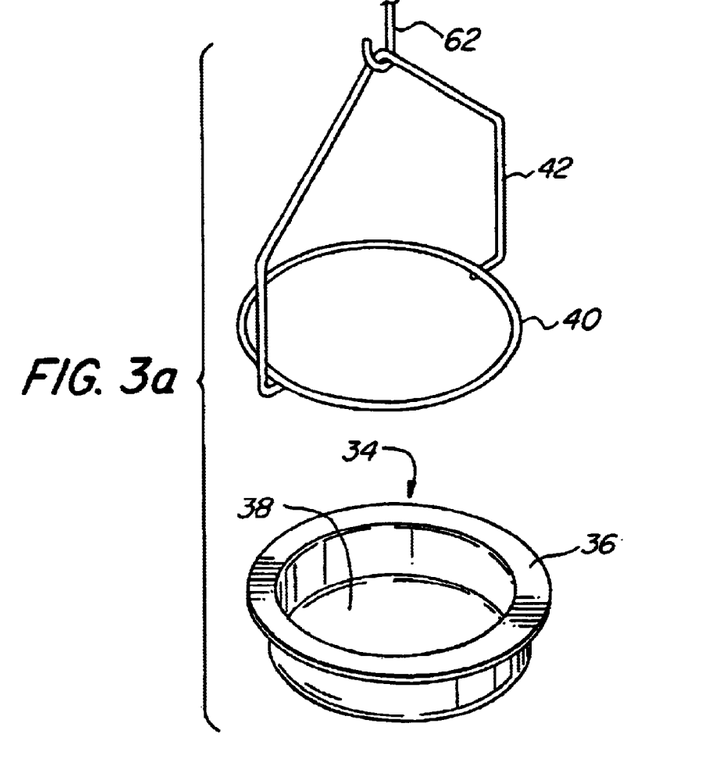
FIG. 3a more particularly depicts the pan shown in FIG. 2.

FIG. 3a more particularly depicts pan 34 shown in FIG. 2. Pan 34 includes flange 36 and cavity 38. Flange 36 holds pan 34 in place when positioned within ring 40 (see FIG. 3b), where ring 40 is connected to stir-up 42 and hang-down wire 62.

Figure 3B:
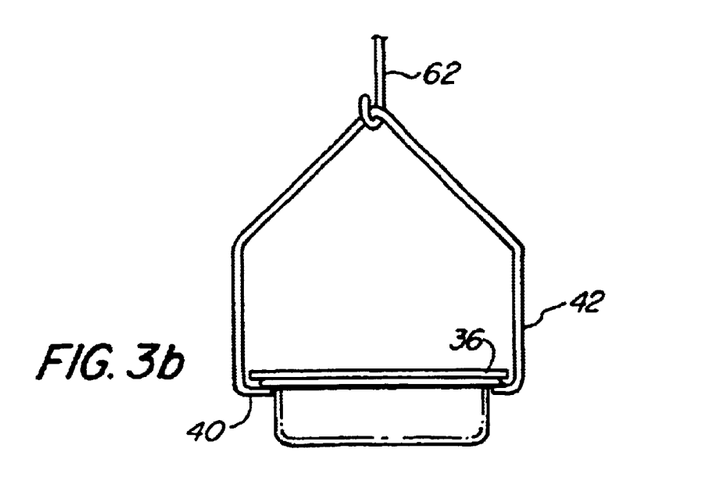
FIG. 3b more particularly depicts the hang-down wire and stir-up shown in FIG. 2.
Figure 4:
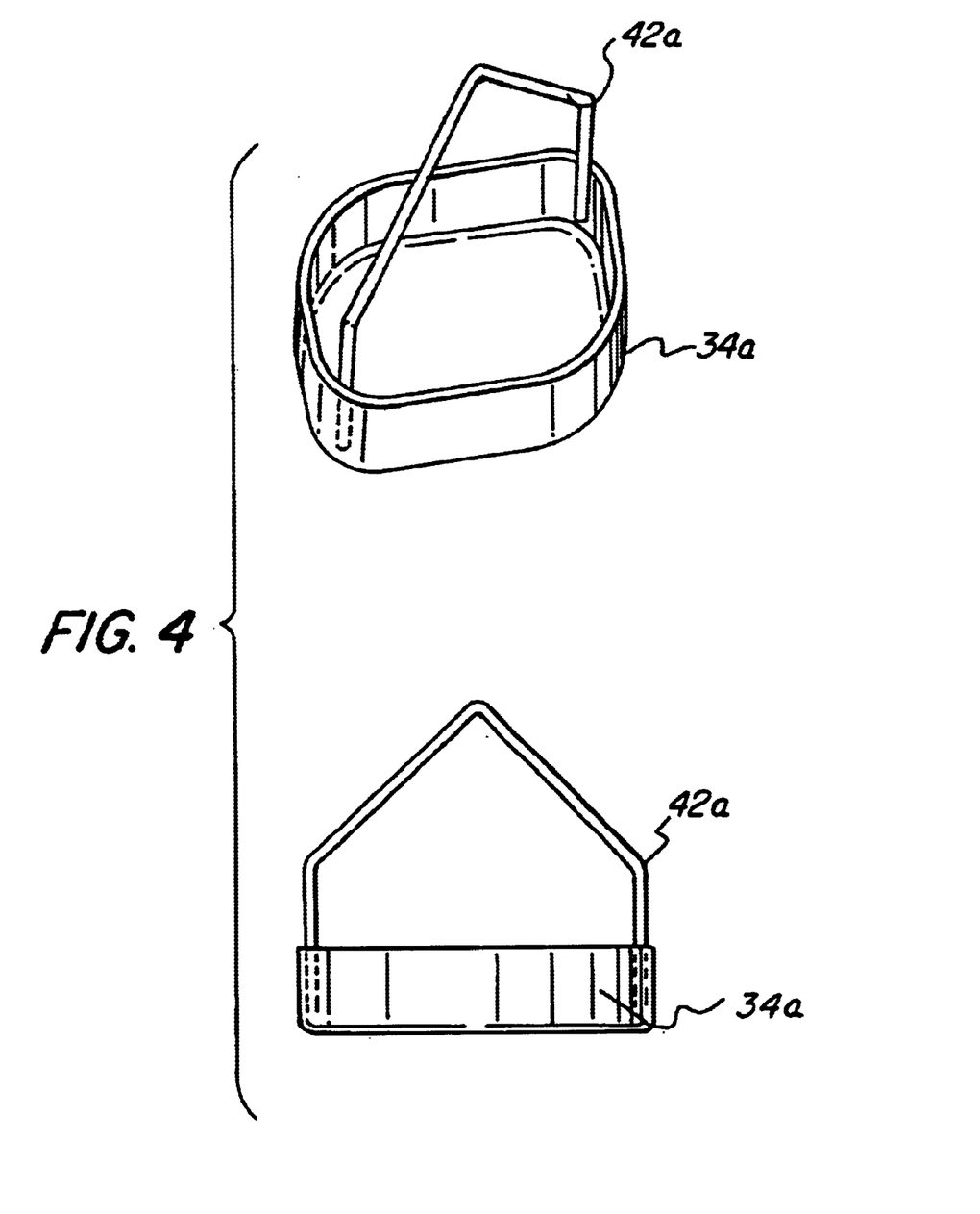
FIG. 4 depicts another embodiment of the pan and stir-up shown in FIG. 2.

FIG. 4 depicts another embodiment of pan 34a and stir-up 42a, where pan 34a and stir-up 42a are connected to each other. In this embodiment, flange 36 is not needed and, therefore, a volume and/or buoyancy of pan 34a is reduced. In both of the embodiments shown in FIGS. 3a–4, the pan is attached to the stir-up and hang-down wire in a manner that permits the pan to be symmetrically balanced about a vertical axis, or generally perpendicular to the hang-down wire. The significance of the volume of pans 34, 34a and hang-down wire 62 is described in more detail below under the description of Archimede's principle.

Figure 5:
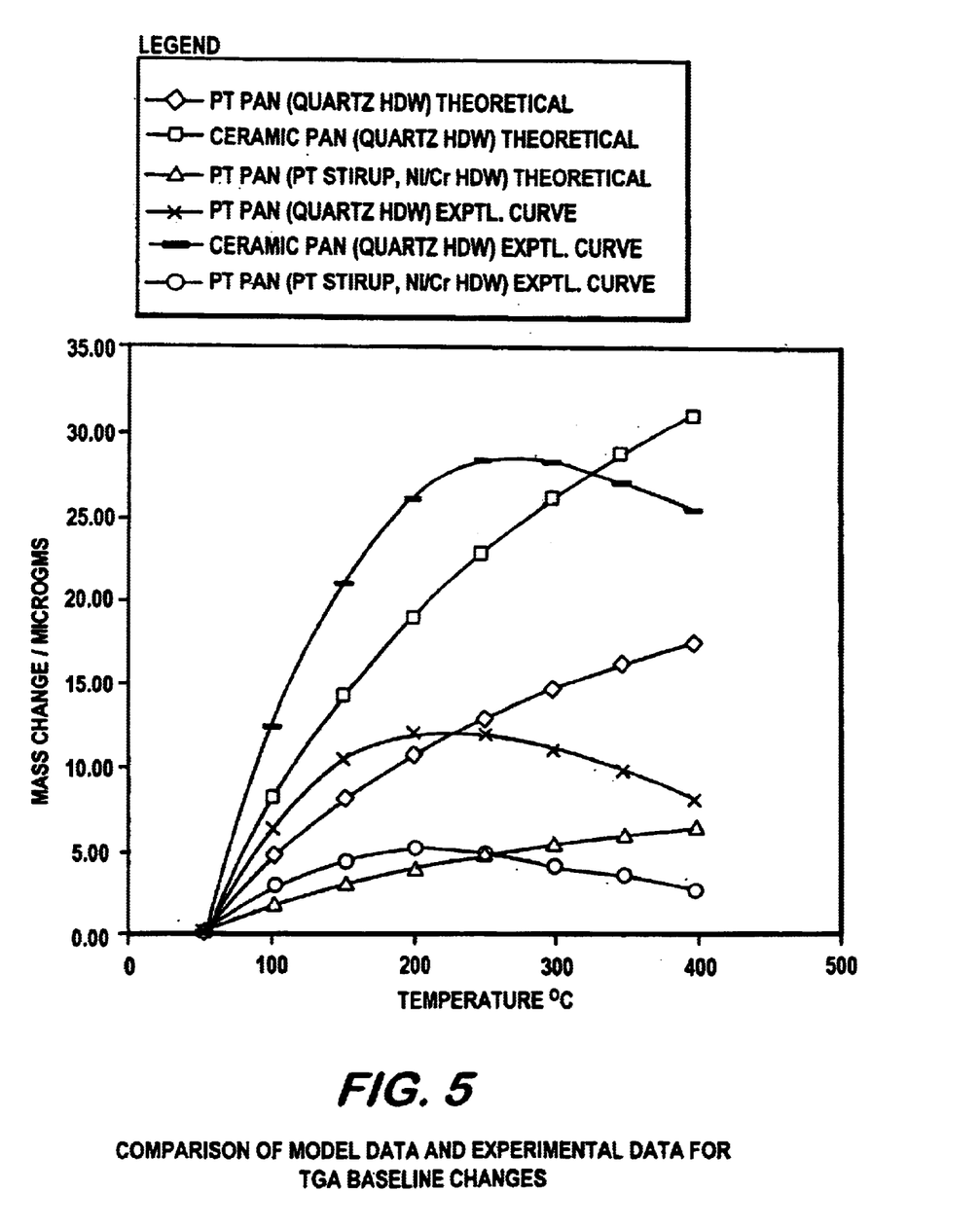
FIG. 5 depicts theoretical and measured data representing variations of weight as a function of temperature where the volume of the pan and hang-down wire is varied and the carrier gas is held constant.

Based on the following derivations of Archimede's principle and measured data, one will find that increasing the density of pan 34 and/or hang-down wire 62, reducing volume, and/or reducing buoyancy of the pan and hang-down wire, and using a carrier gas having a density that does not vary to a great extent over temperature changes contribute toward the reduction of error when measuring minute quantities of weight. More particularly, the reduction in volume of the pan and hang-down wire provide unexpected results not realized in conventional systems, as FIG. 5 shows that reductions in the volumes of the pan and/or hang-down wire reduce changes in the sample's weight and that such reductions in volumes are not mere design choices. The unexpected results include a measurement error, when measuring weight, to be less than 10 micrograms, which is a vast improvement over the traditional TGA, which have a measurement error of approximately 20–40 micrograms and which have traditional pans and hang-down wires shown in FIG. 1.

Assuming isothermal conditions and negligible effects due to convection, and derived from Archimede's principle, the following relationship between measured weight, actual weight, and buoyancy results:

$$W(T) = \text{Actual Weight} - \text{Buoyancy} \quad \text{formula (1)}$$

$$W(T) = V_p \rho_c(T)$$

where W(T) is the measured weight at a given temperature.

$V_p$ is volume of the sample pan plus the volume of the hang-down wire.

$\rho$ is effective density of the sample pan plus the density of the hang-down wire.

$\rho_c$ is the density of the carrier gas and is a function of temperature

T is the temperature in degrees Kelvin.

It should also be understood that variations in the pan's and/or hang-down wire's volumes are also assumed to be negligible because the coefficient of expansion of solids is typically in the area of 1 e–5 m³/m³ between the temperature range of approximately 25–1000° C., which is a temperature range that encompasses our temperature range of interest, which is below 400° C. for reasons that are discussed below under FIG. 6.

Therefore, using formula 1, baseline changes, or variations in weight measurements, may be expressed by the following:

$$W(T_2) - W(T_1) = (\text{Actual Mass-Buoyancy}(T_1)) - (\text{Actual Mass-Buoyancy}(T_2))$$

$$W(T_2) - W(T_1) = V_p(\rho_c(T_1) - \rho_c(T_2)) \quad \text{formula (2)}$$

$$\text{where } V_p = (w_p/\rho_p) + (w_{HDW}/\rho_{HDW}) \quad \text{formula (3)}$$

where $w_p$ is the weight of the pan.

$w_{HDW}$ is the weight of the hang-down wire.

$\rho_p$ is the density of the pan.

$\rho_{HDW}$ is the density of the hang-down wire.

Therefore, based on formulas 2 and 3, one can see that variations in weight readings depend on the weight of the pan, weight of the hang-down wire, volume of the pan, volume of the hang-down wire, density of the carrier gas, and the effects of temperature on the carrier gas' density.

Therefore, as can be seen in the above derivations of Archimede's principle shown in formulas 2 and 3, the lower the volume of pan 34 or hang-down wire 62, the more likely that the variations in weight will be minimized. Reducing the volume of both pan 34 and hang-down wire 62 reduces variations in weight to a greater degree than reducing the volume of pan 34 or hang-down wire 62.

To reduce volume, pan 34 and/or wire 62 may have walls that are thinner than conventional systems. In addition to or instead of thinning the walls, the invention envisions other manners for reducing the volume of pan 34 and/or wire 62, such as reducing the dimensions and size of pan 34 and/or wire 62.

As can be seen in formulas 2 and 3, the lower the volume of pan 34 and hang-down wire 62 the more likely that the variations in weight will be minimized. The volume of pan 34 is generally less than approximately 0.020 cm³. The volume of pan 34 is preferably less than approximately 0.009 cm³ and a more preferred volume of pan 34 is less than approximately 0.005 cm³. Ideally, the lower limit for the volume of pan 34 approaches 0 cm³.

Similarly, the lower the volume of hang-down wire 62, the more likely that the variations in weight will be minimized. The volume of hang-down wire 62 is generally less than approximately 0.01 cm³. The volume of hang-down wire 62 is preferably less than approximately 0.008 cm³ and a more preferred volume of hang-down wire 62 is less than approximately 0.006 cm³. Ideally, the lower limit for the volume of hang-down wire 62 approaches 0 cm³.

Although Archimede's principle primarily relates variation in weight with the volume and density of pan 34 and hang-down wire 62, reducing the volume of stir-up 42 further contributes to a reduction in weight measurement error. Pan 34 and hang-down wire 62 are primarily addressed because of their larger volumes relative to stir-up 42 and reducing these larger volumes contributes more, or has a greater impact, toward reducing weight measurement error than reducing the volume of stir-up 42. However, reducing all volumes of pan 34, stir-up 42, and hang-down wire 62 is desired.

As shown in FIGS. 3a and 3b, and for exemplary purposes only, flange 36 has an outer diameter of approximately 0.28 inches and an inner diameter of approximately 0.24 inches. The overall height of pan 34 is approximately 0.07 inches, where the approximate thickness of all walls of pan 34 is 6 mils. Ring 40 has a diameter of approximately 0.255 inches. Stir-up 42 and ring 40 have an overall thickness of approximately 10 mils.

As shown in FIG. 4, and for exemplary purposes only, pan 34a has an elliptical shape with a measurement of approximately 9 mm along its longest outer dimension, 7 mm along its shortest outer dimension, and an overall height of approximately 2.25 mm. Stir-up 42a has an approximate height of 7.84 mm and a width of 8.5 mm. The approximate thickness of pan 34a, hang-down wire 62, and stir-up 42a is 0.13 mm.

To further enhance the reduction of the volume of pan 34 and/or hang-down wire 62, the invention may use higher density materials for pan 34 and hang-down wire 62. According to formula 3, increasing density reduces variations in weight. The density of pan 34 and hang-down wire 62 is higher than approximately 3.97 g/cm³. The density of pan 34 and hang-down wire 62 is preferably higher than approximately 5.6 g/cm³ and a more preferred density of pan 34 and hang-down wire 62 is higher than approximately 10.0 g/cm³. Ideally, there should not be an upper limit for the density. However, realistically, the upper limit of the density of pan 34 and hang-down wire 62 is lower than approximately 30 g/cm³ and preferably lower than approximately 35 g/cm³.

It should be understood that the limitations for pan 34a and stir-up 42a include the limitations for pan 34 and stir-up 42. Descriptions specifically directed to pan 34a and stir-up 42a were omitted to reduce repetition.

The following is a list of materials and their respective approximate densities that may be used, instead of traditionally low density materials such as Quartz or alumina, for providing hang-down wire 62 and/or sample pan 34:

TABLE A

| Material | Density (gm/cm³) |
| --- | --- |
| Zirconia | 5.68 |
| Zirconium Nitride | 7.09 |
| Stainless Steel | 7.9 |
| Nickel | 8.9 |
| Nickel/Chrome Alloy | 8 |
| Lead Oxide | 9.35 |
| Antimony oxide | 5.7 |
| Ytterbium oxide | 9.2 |
| Tungsten | 19.3 |
| Tungsten Carbide | 15.6 |
| Tungsten oxide | 7.2 |
| Tantalum | 16.4 |

TABLE A-continued

| Material | Density (gm/cm³) |
|---|---|
| Tantalum Oxide | 8.2 |
| Tantalum Carbide | 14.3 |
| Platinum | 21.45 |

Quartz and Alumina is known to have approximate densities of 2.55 and 3.97 g/cm³, respectively. It should be understood that the above list of materials is not exhaustive and that any material having a density in the approximate area, or higher, as those materials listed above in Table A may be used.

By way of example, FIG. 5 graphically shows theoretical and measured data representing variations of weight as a function of temperature where pan 34 and hang-down wire 62 have varying volumes and where the same carrier gas Nitrogen is used in all cases. In this effort, the effect of volume on the weight measurement may be shown. As illustrated, the ceramic pan has a volume of approximately 0.034 cm³, which is common for traditional pans. The inventive platinum pan has a volume of approximately 0.009 cm³ and, as shown, has a lower variation in weight readings than the traditional ceramic pan. In addition, the higher density of the platinum pan further reduces the weight variation over the ceramic pan. Nitrogen was used as the common carrier gas for all cases shown in FIG. 5.

During some experiments it may be desirable to vary temperature and, in these embodiments, it may be desirable for the invention to include a carrier gas having a density that does not greatly vary over the varying temperature range. Referring to formula 2, the density of the carrier gas at $T_2$ is subtracted from the density of the carrier gas at $T_1$. The smaller the variation between the densities, the smaller the variation in weight measurement. Hence, in addition to or instead of reducing the volume of the pan, stir-up, and/or hang-down wire, the carrier gas chosen should have a minimized density variation over temperature changes. In other words, the smaller the variation in density over the operating temperature range, or the experiment's temperature range, the more desirable the carrier gas.

Helium is generally a preferred carrier gas because of its low variation in density over varying temperatures. The density of Helium is approximately 0.16 kg/m³ at 25° C. at 1 atm and 0.070 kg/m³ at 400° C. at 1 atm. Nitrogen, which is commonly found in traditional apparatuses, has a density of approximately 1.14 kg/m³ at 25° C. at 1 atm and 0.5 kg/m³ at 400° C. at 1 atm. Hence, over the same temperature range, there is a difference in density of 0.090 kg/m³ for Helium and 0.64 kg/cm³ for Nitrogen. Nitrogen has a variation in density more than 7 times greater than Helium, evidencing the benefits, when considering Archimede's principle, of Helium over Nitrogen. Besides having a relatively low variance in density over Nitrogen, Helium is preferred because it is usual inert when combined with other compounds. Inert is defined to be an ability to remain chemically non-reactive with the other components of the experiment.

In some experiments, where inertness is not required or desired, Hydrogen may be used. In other embodiments, Hydrogen may be used because the other components of the experiment do not react with Hydrogen, in which case Hydrogen would exhibit characteristics similar to Helium with respect to inertness. Hydrogen's density is approximately 0.08 kg/m³ at 25° C. at 1 atm and 0.035 kg/m³ at 400° C. at 1 atm. The variation in density is approximately 0.045 kg/m³, which is even less than Helium.

In still further embodiments, a combination of gases may be used as a carrier gas, such as Helium and anywhere from approximately a few ppm of oxygen to approximately 21% oxygen, depending upon the experiment. When oxygen is desired in an experiment, a preferred combination of Helium and oxygen is approximately 99% Helium and 1% oxygen.

In cases where air, which is 79% $N_2$+21% $O_2$, is desired as a carrier gas, the invention replaces Nitrogen with Helium for benefits of a lower density and buoyancy, resulting in 79% Helium+21% $O_2$.

In even further embodiments, if experiments use mixtures of another gas besides Nitrogen, such as a non-reactive gas that may be labeled, for example, gas X, and a reactive gas Y, it is preferred to replace gas X, or the non-reactive gas, with Helium, thereby resulting in Helium and the reactive gas Y where the concentration of the reactive gas Y remains the same. Hence, in these embodiments, the invention replaces the non-reactive gases, or at least gases with relatively high fluctuations in density as compared to Helium or Hydrogen.

Figure 6:
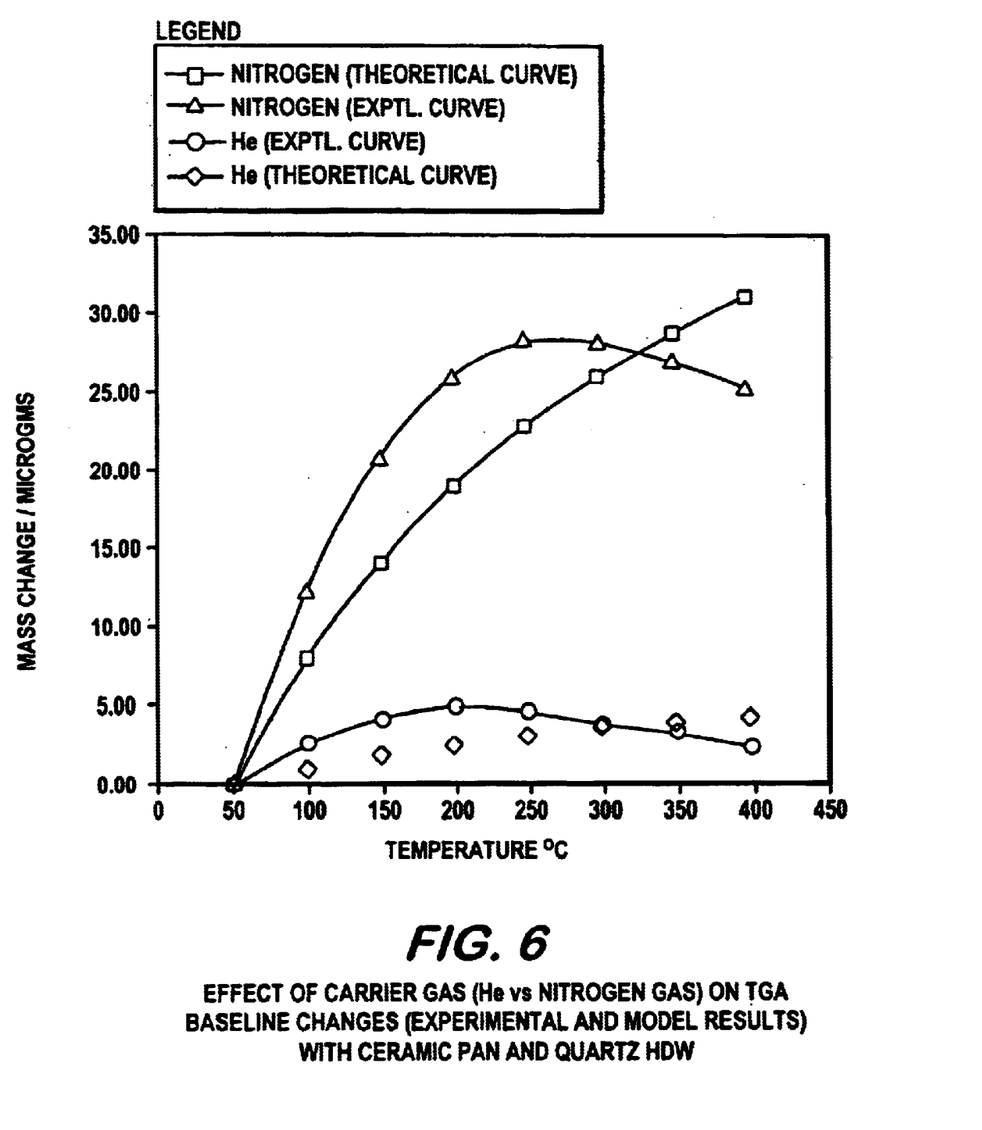
FIG. 6 depicts theoretical and measured data representing variations of weight as a function of temperature where the carrier gas is varied and where the material for the pan and hang-down wire is constant.

FIG. 6 graphically depicts theoretical and measured data representing variations of weight as a function of temperature where the carrier gas is varied and the material for pan 34 is ceramic and hang-down wire 62 is quartz for all cases shown in FIG. 6. In this effort, the effect of the carrier gas may be shown. As illustrated, variations of weight readings when Nitrogen, a carrier gas traditionally used, is higher than when a carrier gas of lower density, such as Helium, is used.

Figure 7:
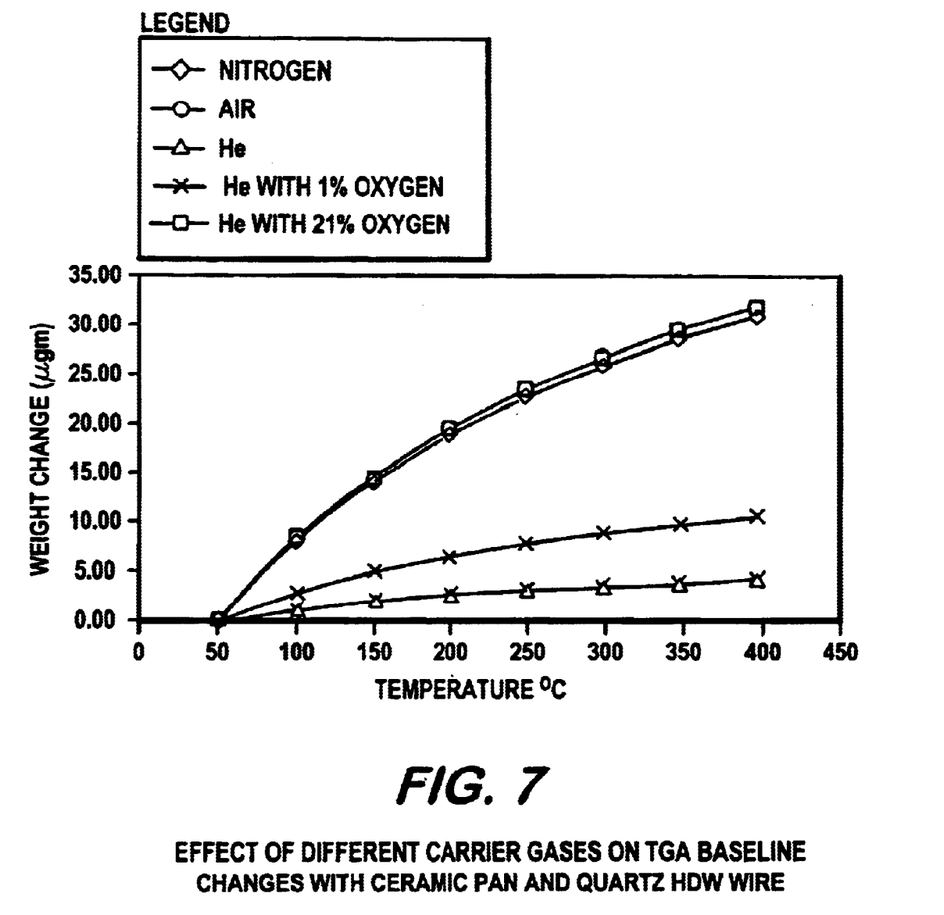
FIG. 7 depicts further theoretical and measured data representing variations of weight as a function of temperature where the carrier gas is varied and where the material for the pan and hang-down wire is constant.

FIG. 7 graphically depicts additional theoretical and measured data representing variations of weight when the carrier gas is varied, particularly when the carrier gas is a mixture of gases. The material for pan 34 is ceramic and hang-down wire 62 is quartz for all cases shown in FIG. 7. As shown, air, which is a mixture of gases, and nitrogen exhibit a higher variation in weight readings than helium or when helium replaces the nitrogen normally found in air. Also as shown, the higher the concentration of helium, the lower the variation in weight, indicating that helium provides unexpected improvements as a carrier gas over traditionally used carrier gases of nitrogen and the like.

It should be known that at or around 400° C., the theoretical and measured data in FIGS. 5–7 suggest that convection begins to affect the experiment and is, therefore, no longer negligible. Typically, it is generally preferred for the measured data to vary as little as possible from theoretical data. A variation of less than 20% is preferred, less than 10% is more preferred, and less than 5% is most preferred. Above approximately 400° C., convection increases the variation between theoretical and measured data and, hence, the experimental data and invention's basis upon Archimede's principle becomes more limited.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An instrument for measuring weight, comprising:

a pan for holding a sample to be weighed;

a chamber for forming an enclosure about said pan;

a hang-down wire coupled to said pan for suspending said pan within said chamber and adapted to be coupled to a weight sensor;

said pan having a volume less than 0.020 cm³; and said hang-down wire having a volume less than 0.01 cm³.

2. The instrument according to claim 1, said pan having a volume of less than 0.009 cm³.

3. The instrument according to claim 1, said pan having a volume less than 0.005 cm³.

4. The instrument according to claim 1, said hang-down wire having a volume less than 0.008 cm³.

5. The instrument according to claim 1, said hang-down wire having a volume less than 0.006 cm³.

6. The instrument according to claim 1, wherein said chamber further includes a carrier gas.

7. The instrument according to claim 6, wherein said carrier gas is helium.

8. The instrument according to claim 6, wherein said carrier gas is hydrogen.

9. An instrument for measuring weight, comprising:
    a pan for holding a sample to be weighed;
    a chamber for forming an enclosure about said pan; and,
    a hang-down wire coupled to said pan for suspending said pan within said chamber and adapted to be coupled to a weight sensor;
    where said chamber includes a carrier gas being hydrogen.

10. The instrument according to claim 9, wherein said carrier gas has at least a second part being a reactant gas.

11. A method for measuring weight, comprising:
    providing a pan having a volume of less than 0.020 cm³ for holding a sample to be weighed;
    forming an enclosure about the pan;
    suspending the pan within the enclosure with a hang-down wire having a volume less than 0.01 cm³; and
    coupling the hang-down wire to a weight sensor.

12. The method according to claim 11, further comprising reducing the volume of the pan to less than 0.009 cm³.

13. The method according to claim 11, further comprising reducing the volume of the pan to less than 0.005 cm³.

14. The method according to claim 11, further comprising reducing the volume of the hang-down wire to less than 0.008 cm³.

15. The method according to claim 11, further comprising reducing the volume of the hang-down wire to less than 0.006 cm³.

16. The method according to claim 11, further comprising placing a carrier gas within the enclosure having a density that is generally consistent over changes in temperature.

17. A method for measuring weight, comprising:
    providing a pan for holding a sample to be weighed;
    forming an enclosure about the pan;
    suspending the pan within the enclosure with a hang-down wire;
    adapting the hand-down wire to be coupled to a weight sensor; and
    placing a carrier gas within the enclosure having a density that varies less than approximately 0.09 g/cm³ over a temperature range from approximately 0–400° C.

18. The method according to claim 17, further comprising reducing a volume of the pan to less than 0.009 cm³.

19. The method according to claim 17, further comprising reducing the volume of the hang-down wire to less than 008 cm³.

* * * * *